May 1, 1962    P. S. SMITH    3,031,920
MOSAIC PHOTOGRAPHY
Filed Oct. 18, 1956    2 Sheets-Sheet 1
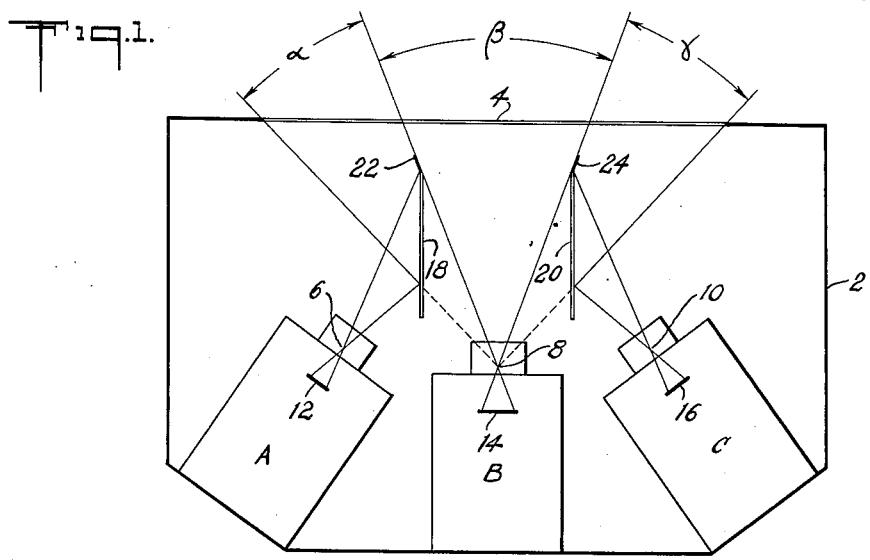
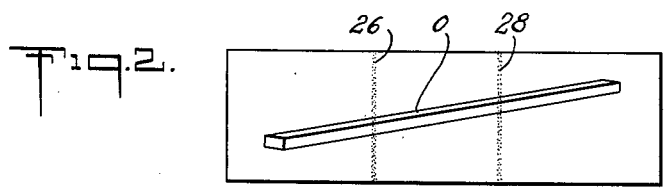
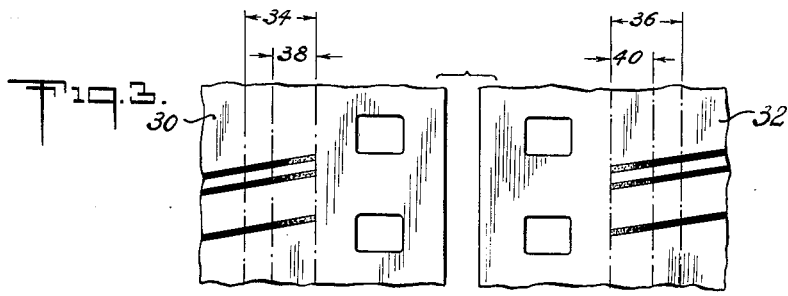
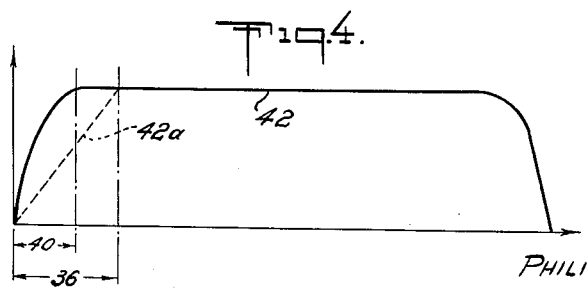
INVENTOR
PHILIP STANLEY SMITH
BY
Eyre, Mann & Barrows
ATTORNEYS May 1, 1962

P. S. SMITH 3,031,920

MOSAIC PHOTOGRAPHY

Filed Oct. 18, 1956

Exposed production negative

Unexposed negative film

To camera

INVENTOR
PHILIP STANLEY SMITH
BY
Eyre, Mann & Burrows
ATTORNEYS

United States Patent Office 3,031,920
Patented May 1, 1962

3,031,920
MOSAIC PHOTOGRAPHY
Philip Stanley Smith, Camden, N.J., assignor to Smith-Dieterich Corporation, a corporation of New York
Filed Oct. 18, 1956, Ser. No. 616,772
6 Claims. (Cl. 88—16.6)

The present invention relates to mosaic photography and more particularly to mosaic cinematography and comprises novel means and method for eliminating mismatching at the junction of projected images comprising the elements of the mosaic. The invention comprises also the novel projection films resulting from the practice of the new method. In mosaic photography portions of a wide angled scene are simultaneously photographed by a plurality of cameras each positioned to cover a given portion of the scene.

As described in my pending applications Serial Nos. 570,369, now Patent No. 2,896,503, and 590,995, now Patent No. 2,918,842, filed respectively March 8, 1956, and June 12, 1956, parallax is avoided by optically centering the scene at the entrance pupil of a single camera by means of mirrors so positioned that but the one camera directly views its portion of the scene to be photographed and the other camera or cameras each views its respective portion of the scene by reflection from a mirror. After the films of the cameras have been developed and printed the original scene is reproduced by simultaneous projection.

It is important in such type of photography that there be no discontinuity at the junction of the portions of the scene photographed by the separate cameras. The cameras preferably are so positioned that there will be a transition area along the edge of each film in which objects of the scene are duplicated on films of adjoining cameras. In projection the images on these transition areas are superposed thus insuring continuity of the projected scene. The width of the transition areas of the films depends upon the aperture opening of the camera, the width decreasing with reduction in iris opening. If the width of the transition area is too little it is difficult to insure the proper overlap during projection and at times there may be portions of the scene which do not get reproduced on any film. In order to insure no variation in light intensity at the junction areas during projection the film density should vary over the entire transition area. In practice, however, the width of the area over which the density varies has been found to be less than the width of the transition area. This has resulted in bright lines on the screen corresponding in width to the portions of the transition areas of uniform density.

In accordance with the present invention means are provided for insuring that the transition area will always be of a width sufficient to insure against loss of picture and that the portion of the film of varied density will correspond in width to the transition area. The term "vignette" has been given to the portion of a film of graduated density and this term will be used hereinafter.

In accordance with the invention the vignette is made to have the same width as the transition area by so exposing a narrow strip of either the negative or the positive film at a suitable stage of the photographic process that there is superposed over the transition area a region wherein light transmission is varied. Thus, when the transition areas are overlapped during projecting, excess light will not be projected to the screen at the junction areas. The exposure to provide a sufficiently wide vignette can be effected, for example, by preparing a mask from which a negative having an opaque central area and a band or bands along the side or sides of graduated density can be prepared and through which an exposed production negative film prior to development can be illuminated. Alternatively the desired vignette can be effected by exposure of a positive film prior to the printing operation along a narrow band on one or both sides of the film, or the unexposed negative film prior to exposure at a camera may be exposed to light along the edge or edges thereof. The width of vignette is varied with the diaphragm opening to insure correspondence with width of transition area.

For a better understanding of the invention reference may be had to the accompanying drawings of which FIG. 1 is a diagram explanatory of a suitable camera arrangement for mosaic photography, the arrangement illustrating a plan view of a three camera set up;

FIG. 2 is a diagram representing an image projected from films developed and printed from the cameras of FIG. 1;

FIG. 3 is an enlarged fragmentary view of adjoining edges of uncorrected films developed from two of the cameras of FIG. 1;

FIG. 4 is a graph which will be used for explanation of the invention;

Figure 5:
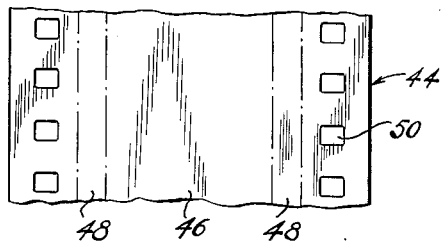
FIG. 5 is a fragmentary plan view of a masking negative film made by use of a mask in accordance with one embodiment of the invention.

In FIG. 1 the general layout of three cameras for mosaic photography of the type disclosed in my said prior application Serial No. 570,369 is shown. For constructional details reference may be made to the above mentioned application.

Three cameras A, B and C are positioned within an enclosure 2 having an opening 4 through which the scene to be photographed is viewed. The entrance pupil of camera A is indicated diagrammatically at 6, that of camera B at 8 and that of camera C at 10 and the corresponding films of cameras A, B and C are indicated diagrammatically at 12, 14 and 16, respectively. The entrance pupil 8 of camera B is the optical center of the system. A pair of wall members 18 and 20, which are shown generally parallel but need not be so, are so positioned that only rays entering the opening 4 through the central angle $\beta$ reach the entrance pupil 8 of camera B. Rays entering the aperture 4 through the angle $\alpha$ strike one surface of the wall 18, which surface is mirrored to reflect such rays to the entrance pupil 6 of camera A. Similarly, rays entering the aperture 4 through the angle $\gamma$ strike the mirrored surface of wall 20 and are reflected to the entrance pupil 10 of camera C. The inner surfaces of walls 18 and 20 are non-reflecting to confine the light rays entering camera B to the angle $\beta$. Preferably, as described in the said pending application, thin vanes 22 and 24 disposed at the remote ends of wall members 18 and 20 respectively and in the planes of the limiting rays entering camera B are provided for preventing the side cameras from receiving direct rays from the portion of the scene to be photographed by camera B. Theoretically, for elimination of parallax, the optimum position of cameras A and C with respect to camera B and the mirrored surfaces of the wall members 18 and 20 is such that the entrance pupil 8 is the mirror image of the entrance pupils of each of the other cameras.

In practice, I have found that better results are obtained when the mirrored surfaces are shifted through a small angle away from the theoretical position for perfect optical centering and in a direction to increase the width of the transition areas on the films. A shift, for example, through but .06° sufficiently increases the width of the transition area to avoid loss of picture when the iris openings are reduced. Such angular shift of the mirrors does not appreciably introduce parallax.

Along each margin of the film 14 and along one edge of each of the films 12 and 16 there is a vignetted strip which should be coincident in width with the transition area. In practice the width of the vignettes has been less than the width of the transition areas and therefore when images, projected through the transition areas, have been superposed to match the portions of the scene, excess light is projected to the screen along the borders of the mosaic. For example, for a film of a width of .999" between sprocket holes the theoretical vignette on each side of the film of camera B should be .055" whereas with average exposure (stop No. F8), the vignette of such film has been found to be only .027".

In FIG. 2 a projected image of an elongated object O is diagrammatically indicated. The lines 26 and 28 indicate the margins of the portions of the scenes transmitted through the films developed and printed by the camera arrangement of FIG. 1. With optimum overlapping and vignetting the lines 26 and 28 would not appear in the projected scene and the continuity of the object O would not be interrupted at these junction lines.

Lines 26 and 28 will appear as relatively bright narrow strips when the vignetted areas are of less width than the transition areas. This will be better understood by reference to FIG. 3 wherein, on a greatly exaggerated scale, is shown one edge of an uncorrected positive or a negative film 30 taken by camera A of FIG. 1 and, on the same scale, is shown an edge of an uncorrected positive or a negative film 32 taken by camera B of FIG. 1. In FIG. 4 the solid line curve 42 represents light transmission through the film 32. The transition area on film 30 is indicated at 34 and that of film 32 at 36. The vignetted area of film 30, where the transmission curve such as curve 42 falls off, is indicated at 38 and that of film 32 at 40. In projecting through the films 30 and 32, the projectors must be so positioned that the images projected through the transition areas 34 and 36 of the films 30 and 32 are superposed. Full light intensity will pass through the unvignetted portions of the transition bands of each film where transmission is as high as in the main picture area and therefore yield a light stripe at the lines 26 and 28 of FIG. 2.

Figure 6:
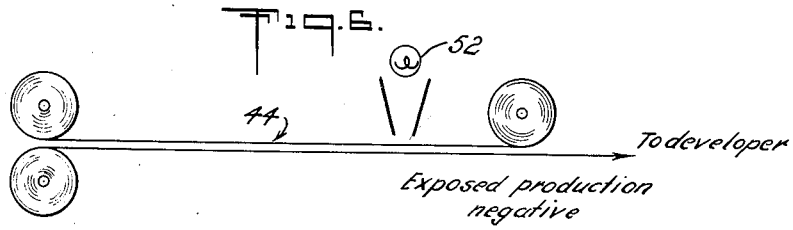
FIG. 6 is a diagram illustrating use of the masking negative of FIG. 5.

In accordance with the invention the positive or negative films are so treated that transmission will fall off uniformly throughout the full width of the transition area, as shown by the dotted line curve 42a of FIG. 4. Thus there will be no discontinuity in light level at the mosaic junctions. In the arrangement illustrated diagrammatically in FIGS. 5 and 6 a negative film 44 is prepared from a suitable mask such that the central area 46 thereof, corresponding to the portion of a production film that lies between the transition areas, is opaque and the area 48 on either side thereof (assuming the negative 44 is to be used for correcting a production negative of camera B) is progressively fogged from the region of the sprocket holes 50 to the central area 46. FIG. 5 can also be considered as representing the mask used for preparation of the negative film. In the case of the mask, the central area 46 would be transparent and the strips 48 would be progressively denser from the area 46 to the mask edge. A series of negative masking films having one or two strips 48 of graduated density thereon, depending upon the camera film to be treated, are prepared for different aperture openings and different focus of the cameras. The masking negatives 44 are then placed over an exposed production negative as indicated in FIG. 6 and the production negative exposed to a light source, indicated diagrammatically at 52, prior to delivery of the production negative to the developer.

Figure 7:
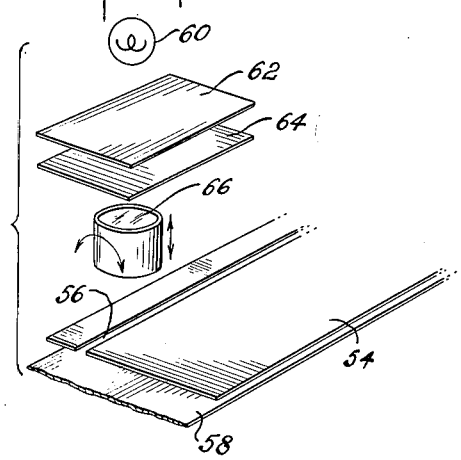
FIG. 7 illustrates the method of the invention as applied to fogging of the positive film.

An alternative arrangement for providing the vignette of desired width is indicated diagrammatically in FIG. 7. In this arrangement a mask 54, having a slot 56 therein is positioned over a positive film 58 and light from a source 60 is transmitted through suitable neutral and color filters 62 and 64 and lens 66 to the positive film through the slot 56. The lens 66 is mounted so that it may be rocked to provide the varying illumination desired to give the graduated exposure of the vignette and also so that it may be moved vertically to vary the width of the vignette.

Figure 8:
FIG. 8 illustrates the method of the invention as applied to fogging of an unexposed negative film.

Still another arrangement is diagrammatically illustrated in FIG. 8 wherein an unexposed negative film in transit to the camera is exposed along one or both edges to a light source 68 through a light wedge 70 which is movable toward and away from the film to vary the width of the vignette to be formed. Other arrangements for gradually reducing light transmission through border areas of films to provide vignettes of proper width in accordance with the invention will occur to those skilled in the art.

The following is claimed:

1. In mosaic cinematography and projection the method of eliminating during projection light discontinuities at regions where projected images of adjacent scene sections overlap by providing a composite vignette in the transition area along at least one side of the positive films used in such projection which comprises the steps of taking on a plurality of strips of negative films moving pictures of adjacent scene sections, overlapping the view in the area along the edge of each adjacent scene section to provide a transition area along at least one side of each of said plurality of strips of negative film each of which overlapping transition areas contains duplicate images of the next adjacent scene section, and while taking such moving pictures introducing a gradation in the intensity of light reaching the film strip in the overlapping transition area to provide a partial vignette in such transition area of the negative film which during the printing of the positive film will provide a controlled gradation in the intensity of light reaching the transition area of the positive film and a partial vignette in the said transition area of the positive film, and as a separate step further controlling the intensity of light used in exposing the said transition area of the positive film to provide an additional vignette in such transition area of the positive film which additional vignette when combined with the first mentioned partial vignette introduced by the negative film will complete the composite vignette in such transition area of the positive film.

2. The method of mosaic cinematography as specified in claim 1 in which the said additional vignette is achieved by subjecting unexposed positive film to a controlled gradation of intensity of light to provide partial exposure and the said additional vignette in such transition area prior to printing the developed negative on such positive film which additional vignette when combined with the first mentioned partial vignette introduced by the negative film during the printing operation will complete the composite vignette.

3. The method of mosaic cinematography as specified in claim 1 in which the said additional vignette is achieved during the printing operation before the positive film is developed by introducing an additional controlled gradation in the intensity of the light rays reaching the transition area of the positive film over and above that introduced by the partial vignette of the negative film to provide the said additional vignette which when combined with the first mentioned partial vignette introduced by the negative film will complete the composite vignette in the transition area of the positive film.

4. The method of mosaic cinematography as specified in claim 1 in which the said additional vignette is achieved by subjecting the exposed negative film prior to development to a controlled gradation of intensity of light in the transition area thereof to provide further exposure and the said additional vignette in such transition area which additional vignette when combined with the first mentioned partial vignette of the negative film will complete the composite vignette in the transition area of the positive film.

5. The method of mosaic cinematography as specified in claim 1 in which the said additional vignette is achieved by subjecting unexposed negative film to a controlled gradation of intensity of light in the transition area to provide a partial exposure and the said additional vignette in the transition area which additional vignette when combined with the first mentioned partial vignette introduced during exposure of the entire negative film will complete the composite vignette in the transition area of the positive film.

6. The method of mosaic cinematography as specified in claim 1 in which the first mentioned partial vignette is achieved in the camera by subjecting negative film to a controlled gradation of intensity of light reaching the transition area to provide the said first mentioned partial vignette in the camera during the exposure of the negative film to impress the scene sections thereon.

References Cited in the file of this patent

UNITED STATES PATENTS

| | | |
|---|---|---|
| 466,000 | Barker | Dec. 29, 1891 |
| 545,423 | Chase | Aug. 27, 1895 |
| 1,294,686 | McCormick | Feb. 18, 1919 |
| 1,808,352 | Hollen | June 2, 1931 |
| 2,133,085 | Draper | Oct. 11, 1938 |
| 2,153,901 | Thomas | Apr. 11, 1939 |
| 2,365,212 | Oriol | Dec. 19, 1944 |
| 2,464,793 | Cooke | Mar. 22, 1949 |
| 2,610,544 | Waller et al. | Sept. 16, 1952 |
| 2,816,477 | Waller | Dec. 17, 1957 |

FOREIGN PATENTS

| | | |
|---|---|---|
| 298,615 | Great Britain | Jan. 13, 1930 |
| 2,703 | Australia | Dec. 24, 1931 |